United States Patent
Atarashi et al.

(10) Patent No.: US 6,207,280 B1
(45) Date of Patent: Mar. 27, 2001

(54) MULTILAYER-COATED POWDER AND PROCESS FOR PRODUCING THE SAME

(75) Inventors: Takafumi Atarashi, Tokyo; Katsuto Nakatsuka, 3-5-1403, Moniwadai 4-chome, Taihaku-ku, Sendai-shi, Miyagi, both of (JP)

(73) Assignees: Nittetsu Mining Co., Ltd., Tokyo; Katsuto Nakatsuka, Miyagi, both of (JP)

( * ) Notice: Subject to any disclaimer, the term of this patent is extended or adjusted under 35 U.S.C. 154(b) by 0 days.

(21) Appl. No.: 09/202,212
(22) PCT Filed: Jun. 6, 1997
(86) PCT No.: PCT/JP97/01942
 § 371 Date: Mar. 29, 1999
 § 102(e) Date: Mar. 29, 1999
(87) PCT Pub. No.: WO97/47417
 PCT Pub. Date: Dec. 18, 1997

(30) Foreign Application Priority Data

Jun. 10, 1996 (JP) .................................................. 8-147422

(51) Int. Cl.$^7$ ....................................................... B32B 5/16
(52) U.S. Cl. ......................... 428/403; 427/212; 427/215; 428/404
(58) Field of Search .................................. 428/403, 404; 427/212, 215

(56) References Cited

U.S. PATENT DOCUMENTS

| | | | | |
|---|---|---|---|---|
| 5,474,583 | * | 12/1995 | Celikkaya | 51/309 |
| 5,618,467 | * | 4/1997 | Turk et al. | 252/301.16 |
| 5,763,085 | * | 6/1998 | Atarashi et al. | 428/403 |
| 5,985,466 | * | 11/1999 | Atarashi et al. | 428/570 |
| 6,013,369 | * | 1/2000 | Adachi et al. | 428/403 |

* cited by examiner

Primary Examiner—H. Thi Le
(74) Attorney, Agent, or Firm—Sughrue, Mion, Zinn, Macpeak & Seas, PLLC

(57) ABSTRACT

In producing a multilayer-coated powder by coating the surface of a base powder of a metal, metal oxide, etc. with two or more layers of a metal oxide or the like, the films of a metal oxide or the like are formed through decomposition, etc. from a metal salt as an inexpensive material. This is attained by making the powder particles not to be attacked by acids, etc. when the metal salt decomposition or the like, which yields an acid, etc., is conducted. The multilayer-coated powder is characterized in that the multilayered film comprises at least one layer consisting of a metal hydroxide or metal oxide film formed by the hydrolysis of a metal alkoxide and, as a layer disposed on the outer side of that layer, a coating film consisting of a metal hydroxide or metal oxide film formed by a reaction, e.g., neutralization or pyrolysis, of a metal salt. Upon heating, the metal hydroxide or metal oxide film formed by the hydrolysis of a metal alkoxide becomes a dense metal oxide film.

6 Claims, 1 Drawing Sheet

MULTILAYER-COATED POWDER AND PROCESS FOR PRODUCING THE SAME

TECHNICAL FIELD

The present invention relates to a powder having a multilayered film on the surface and performing a combination of functions. More particularly, the present invention relates to a magnetic powder having a multilayered film on the surface and usable as a starting material for colored magnetic materials, such as magnetic color toners and magnetic color inks, and to a retroreflective pigment, a weather-resistant pigment, and the like.

BACKGROUND ART

Coating the surface of a powder with another substance has conventionally been conducted in order to obtain a powder having a special property or to modify the surface properties of the powder. Since it is difficult to evenly coat the surface of a powder having a small particle diameter, various methods have been investigated as powder-coating means.

Unexamined Published Japanese Patent Application No. 1-119062 discloses a technique for coating a powder with silver for the purpose of heightening the electroconductivity of the powder. Methods for forming a metal coating film on the surface of a metal or metal oxide powder are described, e.g., in Unexamined Published Japanese Patent Applications Nos. 3-271376 and 3-274278.

With respect to methods for forming a metal oxide coating film on the surface of a metal powder, a film of an oxide of the same metal can be obtained also by a method comprising placing the powder in an oxidizing atmosphere. However, this method is not applicable to the formation of a coating film of an oxide of another kind of metal. It is a matter of course that a completely different method should be used when the powder is made of a metal compound or a plastic.

A method usable for forming a coating film of a metal oxide on a powder comprises placing the powder in an aqueous solution of a metal salt, reacting the metal salt to cause precipitation and thus form a metal compound deposit layer on the powder particles, and drying or heating the covered particles to form a metal oxide layer to thereby obtain a coated powder. However, a dense oxide film is difficult to obtain by this method. If the above method is carried out so as to yield a dense oxide film, it is not easy to evenly form a dense film in a desired thickness, for example, because a large film thickness is difficult to obtain.

The present inventors previously invented a method for forming a film of a metal oxide by dispersing a metal powder or a metal oxide powder into a metal alkoxide solution and hydrolyzing the metal alkoxide, and made an application for patent (Unexamined Published Japanese Patent Application No. 6-228604).

The present inventors further developed highly functional powders by alternately forming a metal film and a metal oxide film on the surface of a metal powder or a metal oxide powder, and made an application for patent (Unexamined Published Japanese Patent Application No. 7-90310). For example, the inventor succeeded in obtaining a magnetic powder of a sufficiently white color by forming a coating film of a metal oxide on the surface of a magnetic material powder, such as ferrite or chromium oxide, and forming a coating film of cobalt metal or silver metal thereon, and also in obtaining an insulating powder having satisfactory thermal conductivity by forming a metal oxide film on a powder of a metal having satisfactory thermal conductivity, such as silver metal or copper metal. Furthermore, the present inventors made an application for patent concerning a process which comprises similarly forming a multilayered metal oxide film on the surface of a metal powder or metal compound powder and heating the powder coated with the multilayered metal oxide film to produce a powder having a multilayered denser and more stable metal oxide film (WO96/28269).

As described above, the present inventors have made efforts with a view to developing a highly functional metal or metal compound powder by forming one or more films of a metal oxide or metal on the surface of a metal powder or metal compound powder to thereby impart a property other than those possessed by the metal or metal compound powder serving as core particles.

However, the above-described method in which a metal alkoxide is used as a starting material for forming a film of a metal oxide on the surface of a metal powder or metal compound powder has a drawback that the product developed with the alkoxide has very limited uses because the metal alkoxide is an expensive compound and, hence, the product is, of course, costly.

Although the method in which a film of a metal oxide is formed by precipitation from an aqueous metal salt solution has the problem that an even metal oxide film is difficult to obtain, it has a more serious drawback. Namely, since an acid or alkali is used in reacting the aqueous metal salt solution to cause precipitation or since the reaction yields an acid or alkali as a by-product, the powder particles serving as cores are attacked by the acid or alkali used as a reactant or yielded as a by-product and are thus dissolved, especially when the particles are made of a metal. Because of this drawback, the above method cannot be applied.

An object of the present invention is to eliminate the drawbacks of the above-described prior art techniques and to provide: a highly functional metal or metal compound powder inexpensively; and a technique with which a metal film or a metal oxide film can be formed on an organic powder or the like, and which is applicable to a wide range of powders besides metal or metal compound powders, e.g., organic powders.

DISCLOSURE OF THE INVENTION

The present inventors made investigations on whether or not the deposition method based on precipitation from an aqueous metal salt solution, which method is a conventional means for easily and inexpensively forming a metal oxide film, is applicable. As a result, it has been found that when base particles coated with a metal oxide film formed by the hydrolysis of a metal alkoxide are subjected to the deposition method based on precipitation from an aqueous metal salt solution, the base particles are protected by the metal oxide film formed by the hydrolysis of a metal alkoxide and are hence never attacked even when the precipitation reaction is conducted under such conditions that the base particles are attacked, because the metal oxide film is exceedingly dense as stated above. The present invention has been achieved based on this finding.

Specifically, the various problems described above have been eliminated by the following multilayer-coated powder and process for producing the same according to the present invention:

(1) A multilayer-coated powder, wherein at least one layer of the multilayer comprises a metal hydroxide film or a metal oxide film formed by hydrolysis of a metal alkoxide having thereon a coating film comprising a metal hydroxide film or a metal oxide film formed by a reaction of a metal salt in an aqueous solution;

(2) The multilayer-coated powder according to the above (1), wherein the metal hydroxide or the metal oxide film formed by the hydrolysis of a metal alkoxide is heated;

(3) The multilayer-coated powder according to the above (1) or (2), wherein the metal hydroxide or the metal oxide film formed by the reaction of a metal salt in an aqueous solution is heated after the formation;

(4) A process for producing a multilayer-coated powder, which comprises: forming a metal hydroxide film or a metal oxide film as at least one layer of a multilayered film by hydrolysis of a metal alkoxide; and forming thereon a coating film of a metal hydroxide film or a metal oxide film by a reaction of a metal salt in an aqueous solution;

(5) The process for producing a multilayer-coated powder according to the above (4), wherein the metal hydroxide film or the metal oxide film is formed by the hydrolysis of a metal alkoxide, and then heated; and (6) The process for producing a multilayer-coated powder according to the above (4) or (5), wherein the metal hydroxide film or the metal oxide film is formed by the reaction of a metal salt in an aqueous solution, and then heated.

In the present invention, the powder serving as the base of the multilayer-coated powder of the present invention can be a powder made of an organic substance as well as a powder made of an inorganic substance. Examples of the inorganic substance constituting the inorganic powder in the present invention include metals, such as, iron, nickel, chromium, titanium, and aluminum; metal alloys, such as iron-nickel and iron-cobalt alloys; iron-nickel alloy nitrides; iron-nickel-cobalt alloy nitrides; metal oxides, such as oxides of, e.g., iron, nickel, chromium, titanium, aluminum, and silicon (in this case, silicon is classified in metals); oxides of alkaline earth metals, such as calcium, magnesium, and barium; composite oxides of these, clays, and glasses.

Since one object of the present invention resides in the production of a powder having magnetic properties, such as a magnetic color toner or a magnetic color ink, it is preferred in this case to use a ferromagnetic substance as the base powder of the multilayer-coated powder of the present invention. The ferromagnetic substance may be a metal having a high magnetic permeability, such as iron, nickel, chromium, titanium, or aluminum. However, a ferromagnetic oxide or alloy can also be used, such as ferrite or y-iron oxide.

Also usable as the base powder material in the present invention is a powder made of an organic substance. Examples of the organic substance constituting the base powder in the present invention include natural and synthetic polymers. Examples of the synthetic polymers include polystyrene, polyethylene, polypropylene, polyacrylic esters, polymethacrylic esters, and copolymers of any of the monomers of these polymers with one or more other monomers. Examples of the natural polymers include starch, agarose, cellulose, and gelatin. Other usable examples include semisynthetic polymers, such as acetyl cellulose and hydroxyethyl cellulose. Although the powder of an organic polymer may have irregular particle shapes, it is preferably composed of spherical particles formed by the suspension polymerization method or seed polymerization method or formed by the solution dispersion method or the like. Although some of those organic substances, when in direct contact with an aqueous metal salt solution, may suffer surface corrosion depending on conditions for the reaction of the solution, this influence can be prevented by the present invention.

If a substance which withstands dilute strong acids, such as ferrite, γ-iron oxide, or titanium oxide, is used as a core material, the core particles hardly suffer surface corrosion even when exposed directly to a reaction of an aqueous metal salt solution. However, since the solution may have entered inner parts of the particles, there is a possibility that the multilayer-coated powder produced using the core particles might have been denaturated.

Powders, such as an iron metal powder, nickel metal powder, aluminum metal powder, polystyrene beads, polymethacrylic ester beads, starch beads, and acetyl cellulose beads, suffer surface denaturation in an aqueous solution of a strong acid even when the acid concentration is low, and this may influence the quality of the final product, for example, by causing devitrification. Consequently, If such a substance is used as a core material, it is undesirable to use a metal salt, such as titanium sulfate, titanium chloride, or aluminum sulfate, as a material for forming a metal oxide coating film on the surface of the core material.

With respect to metal salts for use in the treatment based on precipitation by a reaction of an aqueous metal salt solution, which is the most common reaction among reactions of the above-described metal salts, the above problems are severer especially when an acid salt of a metal is used. Although neutralization or pyrolysis is typically used among reactions of a metal salt in an aqueous solution, other reactions may be used.

Examples of the metal used as a metal salt in the present invention include iron, nickel, chromium, titanium, zinc, aluminum, cadmium, zirconium, silicon, tin, lead, lithium, indium, neodymium, bismuth, cerium, antimony, calcium, magnesium, and barium. Examples of salts of these metals include salts of sulfuric acid, nitric acid, hydrochloric acid, oxalic acid, carbonic acid, and carboxylic acids. Chelate complexes of the above metals are also included. A suitable kind of metal salt for use in the present invention is selected according to the property to be imparted to the surface of the powder and the means to be used for production.

In the present invention, a film of a metal oxide or metal hydroxide is first formed by the hydrolysis of a metal alkoxide on particles serving as the base of a multilayer-coated powder, in order to protect the particles. If a metal film is to be formed as one of the layers of the multilayer-coated powder, this metal film should be formed under the metal oxide or metal hydroxide film formed from a metal alkoxide. Accordingly, a metal film may be formed directly on the surface of the base particles. If plural layers of a metal oxide or metal hydroxide film are formed from a metal alkoxide, a metal film can be formed between these layers. It is, however, undesirable to form a metal film over the metal oxide or metal hydroxide films.

In the present invention, an alkoxide of the same metal as that contained in the metal hydroxide or metal oxide film to be deposited as a coating film on the surface of particles serving as the base of a multilayer-coated powder is hydrolyzed to form a film of the metal hydroxide or metal oxide.

This method comprises dispersing the powder serving as a base material into a solution of the metal alkoxide (mostly in an organic solvent or in a mixed solvent consisting of an organic solvent and water) and adding water or a weakly alkaline aqueous solution to the solution containing the dispersed particles to hydrolyze the metal alkoxide and thereby form a film of a hydroxide or oxide of the metal on the surface of the particles.

Processes for producing a powder having a multilayered metal oxide film using the above method are described in Unexamined Published Japanese Patent Applications Nos. 6-228604 and 7-90310.

The above method for forming a metal oxide by hydrolysis is called a sol-gel method, and is effective in forming an oxide having a fine and homogeneous composition. By applying this method to a powder, a film which is even, thick, and dense is obtained on the powder particles. As the metal alkoxide is selected an alkoxide of the metal corresponding to the desired metal oxide, such as zinc, aluminum, cadmium, titanium, zirconium, tantalum, or silicon.

A metal alkoxide decomposable with water is generally used as a solution in an organic solvent. Usable organic solvents include, for example, alcohols, such as ethanol and methanol, and ketones. It is preferred to use a dehydrated organic solvent. Although the concentration of the metal alkoxide solution varies depending on the kind of the metal alkoxide to be dissolved and on the kind of the organic solvent, optimum conditions are used. The thickness of the metal hydroxide or metal oxide film formed on a powder is determined by the concentration of the metal alkoxide solution and the use amount of the metal alkoxide solution relative to the powder amount.

The powder on which a metal oxide film has deposited is taken out of the solution and dried, whereby a strong metal oxide film is obtained. The drying is preferably conducted in vacuo. If an inorganic powder was used as base particles, it is preferred to further conduct a heat treatment in vacuo or in an inert atmosphere at 200 to 800° C for 0.5 to 6 hours, because this treatment makes the film stronger.

As stated, a metal hydroxide film or metal oxide film is deposited by a reaction of a metal salt in an aqueous solution on the powder particles on the surface of which a metal hydroxide or metal oxide film has been formed from a metal alkoxide.

One method for accomplishing the above uses a metal salt, such as titanium sulfate or aluminum sulfate, as a starting material, and comprises immersing the base particles in an aqueous solution of the metal salt and neutralizing the system with an aqueous solution of a caustic alkali, ammonia, urea, or the like to thereby deposit the resultant metal hydroxide or metal oxide on the powder particles.

Another method for depositing a metal oxide film on the surface of powder particles in the present invention uses a metal salt, such as titanium sulfate or zirconium sulfate, which upon heating decomposes to deposit titanium oxide or zirconium oxide. This method comprises immersing the powder particles in an aqueous solution of such a metal salt and decomposing the metal salt by heating to deposit a metal oxide film on the powder particles and thus form a coating film.

Plural layers of a metal oxide film or the like may be formed from such a metal salt. It is also possible, if desired, to form a film of a metal oxide or the like from a metal alkoxide on these films of a metal oxide or the like.

Thus, a multilayered film can be formed on the powder particles serving as a base. In forming the film, desired properties can be obtained by using such film-forming conditions that each layer has a given thickness.

The particles thus obtained according to the present invention by forming a film of a metal oxide or the like from a metal alkoxide on the surface of base powder particles are not adversely influenced by the treatment for forming thereon a film of a metal oxide or the like from a metal salt. Consequently, a multilayered film of a metal oxide or the like can be formed by a simple procedure using a metal salt as an inexpensive starting material. In particular, that a multilayer-coated powder can be obtained without using an expensive metal alkoxide as a starting material is an important advantage.

In processes for producing the multilayer-coated powder of the present invention, a multilayered film can be formed in various methods. For example, a multilayered film may be formed through continuous steps, or individual coating films may be formed one by one. Alternatively, the formation of a single layer and the continuous formation of plural layers may be conducted in combination.

For the coating with a metal film, contact electroplating or sputtering may be used, besides electroless plating. However, in the contact electroplating, powder particles not in contact with an electrode cannot be plated. In the sputtering, a metal vapor cannot be evenly applied to the powder particles. Hence, the thickness of the coating formed by either method varies from particle to particle. In contrast, the method of film formation by electroless plating is preferred in that a dense and even film can be formed and the film thickness is easy to regulate.

Since the thus-produced powder having a multilayered metal oxide film on the surface can have various properties imparted thereto according to the material of the powder selected and the material of the metal oxide constituting the surface coating film, it can be used in applications for respective purposes. For example, when a magnetic material, such as iron metal, iron nitride, or tri-iron tetroxide, is used as a powder and this powder is coated with silicon oxide, having a lower refractive index than the magnetic material, and further with a layer of titanium oxide, having a higher refractive index, as an outer film, then a magnetic powder having a high degree of whiteness is obtained. When a conductor, such as silver, copper, or aluminum, is used as a powder base and this metal layer is coated with a film of an electrically insulating metal oxide, such as aluminum oxide, then a thermally conductive powder having an electrically insulating surface layer is obtained.

Furthermore, when, for example, coatings having different refractive indexes are formed on a surface of an object each in such a thickness that the product of the refractive index of the substance constituting the film and the thickness of the film corresponds to one-fourth the wavelength of an electromagnetic wave, then most of the light is reflected due to interference (Fresnel reflection). This function can be utilized to produce a magnetic powder for magnetic toners which reflects light and has a shining white color by using a magnetic material, such as a powder of a metal, e.g., iron, cobalt, or nickel, an alloy powder, or an iron nitride powder as cores, forming a layer of a high-reflectance metal, such as silver or cobalt, on the surface of the cores, further forming on the outer side thereof a layer of an oxide having a lower refractive index than that metal, such as silicon oxide, in such a thickness that the product of the refractive index of the oxide and the thickness of this film is one-fourth a wavelength of visible light, and then coating this film with a layer of a high-refractive-index oxide, such as zirconium oxide, in such a thickness that the product of the refractive index of the material and the thickness of this film is one-fourth a wavelength of visible light.

The powder produced may be heated in an inert gas atmosphere at a temperature of from 200 to 800° C. Thus, a stronger powder having a higher degree of whiteness is obtained. If the above heat treatment of the powder is conducted, the powder obtained through the heat treatment should satisfy the requirement that in each layer the product of the refractive index of the material and the film thickness is one-fourth a wavelength of visible light.

Forming a colored layer on this powder and further forming a resin layer thereon gives a magnetic color toner. Since visible light has wavelengths distributed in a certain width, each of the particles constituting the magnetic toner may have oxide layers formed alternately with metal layers so that these layers have slightly different thicknesses within a range in which the product of the refractive index of the material and the film thickness is close to one-fourth a wavelength of visible light.

In producing a multilayer-coated powder as a powder colored by interference reflection, a high-refractive-index film and a low-refractive-index film are alternately formed in respective thicknesses necessary for Fresnel interference so that light of target spectral wavelengths is reflected.

FIG. 1 illustrates such a powder particle by means of a sectional view. This sectional view shows a powder particle colored by interference reflection, which comprises a particle 1 (glass bead) as a base, a metal film 2 formed on the surface thereof, a low-refractive-index metal oxide film A indicated by 3 formed on the film 2 from an alkoxide, and a high-refractive-index metal oxide film B indicated by 4 formed on the film A.

Starting materials, especially metal salts, used in the present invention will be explained below.

Preferred materials used for forming high-refractive-index films include: titanium compounds, such as halides and sulfate for titanium oxide films; zirconium compounds, such as halides, sulfate, carboxylates, oxalate, and chelate complexes for zirconium oxide films; cerium compounds, such as halides, sulfate, carboxylates, and oxalate for cerium oxide films; bismuth compounds, such as halides, nitrate, and carboxylates for bismuth oxide films; and indium compounds, such as halides and sulfate for indium oxide films.

Preferred materials used for forming low-refractive-index films include: sodium silicate, water glass, silicon halides, organosilicon compounds such as alkyl silicates, and polymers thereof for silicon oxide films; aluminum compounds, such as halides, sulfate, and chelate complexes for aluminum oxide films; and magnesium compounds, such as sulfate and halides for magnesium oxide films.

In the case of forming a titanium oxide film, for example, use of a mixture of titanium chloride and titanium sulfate is effective, for example, in giving a film of rutile titanium oxide, having a high refractive index, at a lower temperature.

The reaction for each coating is conducted while regulating the reaction temperature so as to be suitable for the kind of the metal salt or metal alkoxide, whereby a more perfect oxide film can be formed.

After a coating film has been formed, a heat treatment is preferably conducted to completely convert the film into an oxide film.

If hydroxide films or oxide films formed are heated, the heating may be conducted for every coating layer. Alternatively, the heat treatment may be conducted as the final step after the desired multilayered film has been completed.

If a magnesia film has been formed, this film is preferably coated with a titanium alkoxide in an organic solvent, preferably an alcohol, because magnesia is susceptible to hydration.

BEST MODES FOR CARRYING OUT THE INVENTION

Figure 1:
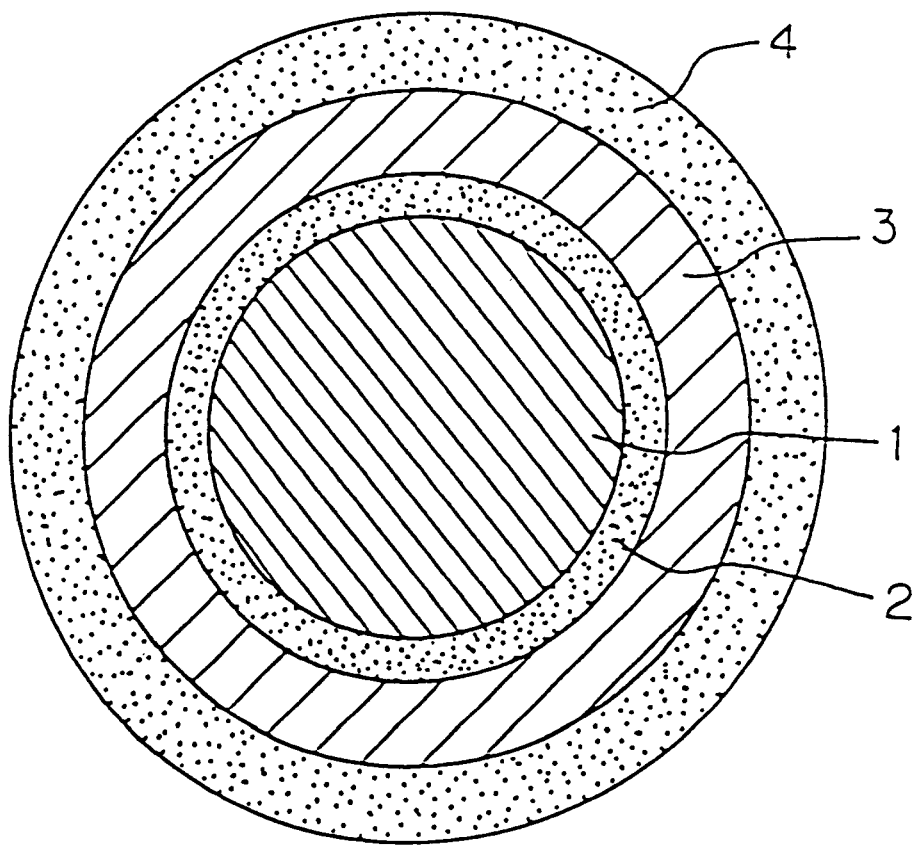
FIG. 1 is a sectional view of one embodiment of the multilayer-coated powder according to the present invention. This embodiment comprises particle 1 as a base, metal layer 2 formed on the surface thereof, and formed thereon low-refractive-index metal oxide film 3 and high-refractive-index metal oxide film 4.

Processes for producing multilayer-coated powders each having plural metal oxide films on the surface, will be explained below by reference to Examples. However, the present invention should not be construed as being limited by the following Examples.

EXAMPLE 1

Formation of Metal Oxide Films: (coating of the surface of iron metal powder with titania film and silica film):
First Layer: Silica Coating:

To 20 g of a spherical iron metal powder (average particle diameter, 1.8 $\mu$m) was added 100 ml of ethanol to disperse the powder. The container was heated in an oil bath to keep the temperature of the liquid at 55° C. Thereto were added 6 g of silicon ethoxide, 6 g of ammonia water (29%), and 8 g of water. This mixture was allowed to react for 3 hours under stirring. After the reaction, the reaction mixture was diluted and washed with a sufficient amount of ethanol and filtered. The solid matter was dried in a vacuum dryer at 180° C for 8 hours. After the drying, the resultant powder was heated with a rotary tubular oven in a nitrogen atmosphere at 650° C for 30 minutes to obtain silica-coated powder A. The silica-coated powder A obtained was excellent in dispersed state.

Second Layer: Titania Coating:

Into a solution prepared by dissolving 16 g of titanyl sulfate in distilled water was dispersed 10 g of the silica-coated powder A obtained above. The container containing the dispersion was heated in an oil bath to hold the dispersion at 90° C for 6 hours.

After the holding, the reaction mixture was washed with a sufficient amount of distilled water until the pH thereof became 5, and the powder was then dried for 8 hours. After the drying, titania-silica-coated powder A was obtained. The titania-silica-coated powder A obtained had satisfactory dispersibility and was composed of independent particles.

This powder had a spectral reflection curve having a peak wavelength of 558 nm and had a reflectance at the peak wavelength of 33%. It was blue-green.

COMPARATIVE EXAMPLE 1

Formation of Metal Oxide Film: (titania coating of the surface of iron metal powder without silica coating):

A container containing 100 ml of deionized water was heated in an oil bath to hold the deionized water at 80° C. Into this heated deionized water was dispersed 10 g of carbonyl iron powder A. A solution prepared by dissolving 7 g of titanium tetrachloride in 100 ml of ethanol was added dropwise over 60 minutes to the dispersion under stirring.

After the dropwise addition, a decomposition reaction for film formation was conducted for 2 hours while maintaining the temperature at 80° C.

At the time when the reaction was completed, the solid matter had turned into a yellow powder and the ion powder had completely dissolved away, leaving the titania gel only.

It is thought that the iron powder was dissolved in the presence of the titanium tetrachloride or by the hydrochloric acid which generated during titania formation from the chloride. Consequently, the formation of a titania film is impossible if an oxide film has not been formed beforehand.

EXAMPLE 2

Formation of Metal Oxide Films: (coating of the surface of iron metal powder with titania film and silica film): First Layer: Silica Coating:

Silica coating was conducted in the same manner as in Example 1. To 20 g of a spherical iron metal powder (average particle diameter, 1.8 µm) was added 100 ml of ethanol to disperse the powder. The container was heated in an oil bath to keep the temperature of the liquid at 55° C. Thereto were added 6 g of silicon ethoxide, 6 g of ammonia water (29%), and 8 g of water. This mixture was allowed to react for 3 hours under stirring. After the reaction, the reaction mixture was diluted and washed with a sufficient amount of ethanol and filtered. The solid matter was dried in a vacuum dryer at 180° C for 8 hours. After the drying, the resultant powder was heated with a rotary tubular oven in a nitrogen atmosphere at 650° C for 30 minutes to obtain silica-coated powder B. The silica-coated powder B obtained was excellent in dispersed state.

Second Layer: Titania Coating:

A container containing 100 ml of deionized water was heated in an oil bath while keeping the oil temperature at 80° C. Into the heated deionized water was dispersed 10 g of the silica-coated powder B. A solution prepared by dissolving 7 g of titanium tetrachloride in 100 ml of ethanol was added dropwise over 60 minutes to the dispersion under stirring.

After the dropwise addition, a decomposition reaction for film formation was conducted for 2 hours while maintaining the temperature at 80° C.

After completion of the reaction, the solid matter was taken out by filtration and washed with a sufficient amount of distilled water and finally with ammonia water to adjust the pH to 8. Thereafter, 200 ml of ethanol was added to wash the solid matter, which was then dried in a vacuum dryer.

The titania-silica-coated powder B obtained had a spectral reflection curve having a peak wavelength of 660 nm, with a reflectance of 40%. It was a skin-colored powder.

EXAMPLE 3

First Layer: Silica Coating:

To 20 g of a spherical iron metal powder (average particle diameter, 1.8 µm) was added 100 ml of ethanol to disperse the powder. Thereto were added 6 g of silicon ethoxide, 11 g of ammonia water (29%), and 8 g of water. This mixture was allowed to react for 3 hours under stirring. After the reaction, the reaction mixture was diluted and washed with a sufficient amount of ethanol and filtered. The solid matter was dried in a vacuum dryer at 180° C for 8 hours. After the drying, the resultant powder was heated with a rotary tubular oven in a nitrogen atmosphere at 650° C for 30 minutes to obtain silica-coated powder C. The silica-coated powder C obtained was excellent in dispersed state.

Second Layer: Titania Coating:

A container was heated in an oil bath while keeping the oil temperature at 80° C. Into 100 ml of heated deionized water was dispersed 10 g of the silica-coated powder C. A solution prepared by mixing 100 ml of ethanol with 11 g of titanium tetrachloride was added dropwise over 60 minutes to the dispersion under stirring.

After the dropwise addition, a decomposition reaction for film formation was conducted for 2 hours while maintaining the temperature at 80° C.

After completion of the reaction, the solid matter was taken out by filtration and washed with a sufficient amount of distilled water and finally with ammonia water to adjust the pH to 8. Thereafter, 200 ml of ethanol was added to wash the solid matter, which was then dried in a vacuum dryer. After the drying, the resultant powder was heated with a rotary tubular oven in a nitrogen atmosphere at 650° C for 30 minutes to obtain titania-silica-coated powder D.

The titania-silica-coated powder D obtained was excellent in dispersed state. It was a skin-colored powder which had a spectral reflection curve having a peak wavelength of 660 nm, with a reflectance of 40%.

Third Layer: Silica Coating:

To 20 g of the titania-silica-coated powder D was added 100 ml of water to disperse the powder. Thereto were added 11 g of water glass and 8 g of water. Furthermore, 250 ml of 0.05 mol/l aqueous hydrochloric acid solution was added dropwise over 1 hour to the above mixture under stirring. The resultant mixture was heated to 80° C and allowed to react for 3 hours.

After completion of the reaction, the reaction mixture was diluted and washed with a sufficient amount of distilled water and filtered. The solid matter was dried in a vacuum dryer at 180° C for 8 hours. After the drying, the resultant powder was heated with a rotary tubular oven in a nitrogen atmosphere at 650° C for 30 minutes to obtain silica-titania-silica-coated powder E (hereinafter referred to simply as "silica-titania powder E"). The silica-titania-coated powder E obtained was excellent in dispersed state.

Fourth Layer: Titania Coating:

A container containing 100 ml of deionized water was heated in an oil bath while keeping the oil temperature at 80° C. Into the heated deionized water was dispersed 10 g of the silica-titania-coated powder E. A solution prepared by mixing 100 ml of ethanol with 11 g of titanium tetrachloride was added dropwise over 60 minutes to the dispersion under stirring.

After the dropwise addition, a decomposition reaction for film formation was conducted for 2 hours while maintaining the temperature at 80° C.

After completion of the reaction, the solid matter was taken out by filtration and washed with a sufficient amount of distilled water and finally with ammonia water to adjust the pH to 8. Thereafter, 200 ml of ethanol was added to wash the solid matter, which was then dried in a vacuum dryer.

The thus-obtained silica-titania powder F, which had a titania coating as the fourth layer, had a spectral reflection curve having a peak wavelength of 780 nm, with a reflectance of 56%. It was a red-purple powder.

INDUSTRIAL APPLICABILITY

According to the present invention, a technique for using inexpensive aqueous metal salt solutions as materials for metal oxide coating films has been developed. As a result, powders coated with metal oxide films can be produced at low cost and are hence usable in a wider range of applications than conventional ones.

Since a powder coated with a multilayered metal oxide film having an excellent function can also be produced at low cost, it can be a general-purpose powder.

The technique of forming a metal oxide coating film from a metal alkoxide is applicable also to powders made of metals or plastics susceptible to corrosion by acids. By using this technique to form the first layer only, less expensive aqueous metal salt solutions can be used for forming the second and any overlying coating layers. The thus-coated powders can hence be used in a wider range of applications than conventional ones.

According to the present invention, a magnetic color toner having light resistance and a technique for producing the same can be provided.

By forming a multilayered interference coating on glass beads, a magnetic color toner or a magnetic color ink can be produced without necessitating any coloring agent. The coated beads provide a distinctive retroreflective pigment.

What is claimed is:

1. A multilayer-coated powder, wherein at least one layer of the multilayer comprises a metal hydroxide film or a metal oxide film formed by hydrolysis of a metal alkoxide having thereon a coating film comprising a metal hydroxide film or a metal oxide film formed by a reaction of a metal salt in an aqueous solution.

2. The multilayer-coated powder according to claim 1, wherein the metal hydroxide or the metal oxide film formed by the hydrolysis of a metal alkoxide is heated.

3. The multilayer-coated powder according to claim 1 or 2, wherein the metal hydroxide or the metal oxide film formed by the reaction of a metal salt in an aqueous solution is heated after the formation.

4. A process for producing a multilayer-coated powder, which comprises: forming a metal hydroxide film or a metal oxide film as at least one layer of a multilayered film by hydrolysis of a metal alkoxide; and forming thereon a coating film of a metal hydroxide film or a metal oxide film by a reaction of a metal salt in an aqueous solution.

5. The process for producing a multilayer-coated powder according to claim 4, wherein the metal hydroxide film or the metal oxide film is formed by the hydrolysis of a metal alkoxide, and then heated.

6. The process for producing a multilayer-coated powder according to claim 4 or 5, wherein the metal hydroxide film or the metal oxide film is formed by the reaction of a metal salt in an aqueous solution, and then heated.

* * * * *